US011227277B2

(12) United States Patent
McClard et al.

(10) Patent No.: US 11,227,277 B2
(45) Date of Patent: Jan. 18, 2022

(54) FACILITATING SMART GEO-FENCING-BASED PAYMENT TRANSACTIONS

(71) Applicant: INTEL CORPORATION, Santa Clara, CA (US)

(72) Inventors: Anne P. McClard, Portland, OR (US); Aaren B. Esplin, Portland, OR (US); Wendy March, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 14/978,872

(22) Filed: Dec. 22, 2015

(65) Prior Publication Data

US 2017/0178117 A1 Jun. 22, 2017

(51) Int. Cl.
 *G06Q 20/32* (2012.01)
 *G06Q 20/22* (2012.01)
 *H04W 4/021* (2018.01)

(52) U.S. Cl.
 CPC ....... *G06Q 20/3224* (2013.01); *G06Q 20/223* (2013.01); *H04W 4/021* (2013.01)

(58) Field of Classification Search
 CPC .. G06Q 20/3224; G06Q 20/223; G06Q 20/32; G06Q 20/22; H04W 4/021
 See application file for complete search history.

(56) References Cited

U.S. PATENT DOCUMENTS

| 6,144,971 | A  | * | 11/2000 | Sunderman | ..........  | G06Q 10/109 |
|           |    |   |         |           |             | 715/205 |
| 6,539,393 | B1 | * | 3/2003  | Kabala    | ..........  | G01S 5/0009 |
| 8,326,315 | B2 | * | 12/2012 | Phillips  | ..........  | G08B 21/0236 |
|           |    |   |         |           |             | 455/456.1 |
| 8,862,150 | B2 | * | 10/2014 | Phillips  | ..........  | G08B 21/0236 |
|           |    |   |         |           |             | 455/456.1 |
| 8,909,248 | B2 | * | 12/2014 | Phillips  | ..........  | G08B 21/0236 |
|           |    |   |         |           |             | 455/456.1 |
| 9,013,333 | B2 | * | 4/2015  | Morgan    | ..........  | G08G 1/207 |
|           |    |   |         |           |             | 340/539.13 |

(Continued)

OTHER PUBLICATIONS

Muhammad Alam, "A Review of Smart Homes—Past, Present, and Future," Nov. 2012, IEEE Transactions on Systems, Man, and Cybernetics—Part C: Applications and Reviews, vol. 42, No. 6, pp. 1190-1203 (Year: 2012).*

(Continued)

*Primary Examiner* — Kenneth Bartley

(74) *Attorney, Agent, or Firm* — Hanley, Flight & Zimmerman, LLC

(57) ABSTRACT

A mechanism is described for facilitating smart geo-fencing-based payment transactions according to one embodiment. A method, as described herein, includes detecting, by one or more capturing/sensing components of a data processing device, a first computing device within proximity of a geo-fenced location. The method further includes receiving detection information relating to the detection of the first computing device, authenticating at least one of the first computing device and the geo-fenced location, and interfacing the first computing device with a second computing device. The method may further include facilitating a payment transaction, where the payment transaction includes payment of a monetary amount from the second computing device to the first computing device, and executing the payment transaction.

18 Claims, 10 Drawing Sheets

(56) References Cited

U.S. PATENT DOCUMENTS

| | | | | |
|---|---|---|---|---|
| 9,020,848 | B1* | 4/2015 | Ridge | G06Q 40/125 705/32 |
| 9,071,931 | B2* | 6/2015 | Diem | G06Q 10/00 |
| 9,111,402 | B1* | 8/2015 | Krishnan | G07C 9/00158 |
| 9,140,569 | B2* | 9/2015 | Ellanti | G01C 21/3438 |
| 9,204,251 | B1* | 12/2015 | Mendelson | G08G 1/14 |
| 9,654,923 | B2* | 5/2017 | Phillips | G08B 21/0236 |
| 9,668,096 | B2* | 5/2017 | Philips | G08B 21/0236 |
| 9,710,821 | B2* | 7/2017 | Heath | G06Q 30/0222 |
| 10,096,011 | B2* | 10/2018 | Camp | G06Q 20/145 |
| 10,147,058 | B1* | 12/2018 | Ouimette | G06Q 10/06 |
| 2002/0028704 | A1* | 3/2002 | Bloomfield | A63F 13/00 463/1 |
| 2002/0046259 | A1* | 4/2002 | Glorikian | G06F 17/3087 709/218 |
| 2002/0115453 | A1* | 8/2002 | Poulin | G06F 17/3087 455/456.4 |
| 2002/0143930 | A1* | 10/2002 | Babu | G01C 21/28 709/224 |
| 2002/0175211 | A1* | 11/2002 | Dominquez | G06K 17/0022 235/492 |
| 2006/0079244 | A1* | 4/2006 | Posner | H04W 60/04 455/456.1 |
| 2006/0270421 | A1* | 11/2006 | Phillips | G08B 21/0236 455/457 |
| 2007/0049267 | A1* | 3/2007 | Kota | G01S 5/0036 455/423 |
| 2007/0293202 | A1* | 12/2007 | Moshir | G06F 21/552 455/414.2 |
| 2008/0174485 | A1* | 7/2008 | Carani | G06Q 10/08 342/357.46 |
| 2008/0177646 | A1* | 7/2008 | Frink | G06Q 10/1091 705/32 |
| 2008/0255919 | A1* | 10/2008 | Gorder | G06Q 10/06 705/7.13 |
| 2008/0296364 | A1* | 12/2008 | Pappas | G06Q 10/06 235/377 |
| 2009/0217076 | A1* | 8/2009 | Okuhara | G06Q 10/06 713/600 |
| 2010/0216396 | A1* | 8/2010 | Fernandez | G06Q 20/102 455/41.1 |
| 2010/0287025 | A1* | 11/2010 | Fletcher | G06Q 10/06 705/7.15 |
| 2011/0022503 | A1* | 1/2011 | Parker-Yules | G06Q 10/10 705/32 |
| 2011/0040691 | A1* | 2/2011 | Martinez | G06Q 20/3224 705/80 |
| 2011/0112943 | A1* | 5/2011 | Dietz | G06Q 10/06 705/32 |
| 2012/0084349 | A1* | 4/2012 | Lee | G06Q 30/02 709/203 |
| 2012/0253982 | A1* | 10/2012 | Wright | G06Q 30/02 705/27.1 |
| 2012/0316963 | A1* | 12/2012 | Moshfeghi | G06Q 20/20 705/14.58 |
| 2013/0006718 | A1* | 1/2013 | Nielsen | G06Q 10/06312 705/7.42 |
| 2013/0073388 | A1* | 3/2013 | Heath | G06Q 30/02 705/14.53 |
| 2013/0090089 | A1* | 4/2013 | Rivere | H04W 12/02 455/411 |
| 2013/0090965 | A1* | 4/2013 | Rivere | G06Q 10/06311 705/7.15 |
| 2013/0090968 | A1* | 4/2013 | Borza | G06Q 10/06 705/7.16 |
| 2013/0090969 | A1* | 4/2013 | Rivere | G06Q 10/06 705/7.19 |
| 2013/0091452 | A1* | 4/2013 | Sorden | G06F 3/048 715/771 |
| 2014/0111380 | A1* | 4/2014 | Gibbs | G01S 5/02 342/451 |
| 2014/0244329 | A1* | 8/2014 | Urban | G06Q 10/063114 705/7.15 |
| 2014/0267799 | A1* | 9/2014 | Sadasivam | H04N 5/23245 348/207.99 |
| 2014/0278629 | A1* | 9/2014 | Stephenson | G06Q 10/1091 705/7.13 |
| 2014/0278645 | A1* | 9/2014 | Davidson | G06Q 10/063114 705/7.15 |
| 2014/0369275 | A1* | 12/2014 | Fleck | H04W 4/001 370/329 |
| 2015/0065177 | A1* | 3/2015 | Phillips | G08B 21/0236 455/456.3 |
| 2015/0081532 | A1* | 3/2015 | Lewis | G06Q 30/0261 705/39 |
| 2015/0121470 | A1* | 4/2015 | Rongo | H04L 63/10 726/4 |
| 2015/0154527 | A1* | 6/2015 | Gill | G06Q 10/06395 705/7.41 |
| 2015/0348214 | A1* | 12/2015 | Jain | G06Q 40/125 705/14.58 |
| 2015/0363745 | A1* | 12/2015 | Hatch | G06Q 10/1091 705/32 |
| 2016/0042470 | A1* | 2/2016 | Shaaban | G06Q 40/12 705/30 |
| 2016/0086141 | A1* | 3/2016 | Jayanthi | H04M 1/72572 705/7.21 |
| 2016/0171451 | A1* | 6/2016 | Pugh | G06Q 10/1093 705/7.18 |
| 2016/0195602 | A1* | 7/2016 | Meadow | G01S 5/10 701/517 |
| 2016/0217422 | A1* | 7/2016 | Dujisin | G06Q 10/103 |
| 2016/0253651 | A1* | 9/2016 | Park | G06F 3/0482 705/39 |
| 2016/0292781 | A1* | 10/2016 | Nahmad | G06Q 30/0645 |
| 2016/0316414 | A1* | 10/2016 | Yeoum | H04L 65/1016 |
| 2016/0335686 | A1* | 11/2016 | AthuluruTlrumala | G06F 3/0482 |
| 2017/0048668 | A1* | 2/2017 | Lee | H04W 52/0254 |
| 2017/0076400 | A1* | 3/2017 | Woo | G06F 21/46 |
| 2017/0086204 | A1* | 3/2017 | Jung | H04W 16/28 |
| 2017/0168678 | A1* | 6/2017 | Bozovich, Jr. | G06F 3/04817 |
| 2017/0178117 | A1* | 6/2017 | Mcclard | G06Q 20/3224 |
| 2017/0293848 | A1* | 10/2017 | Sorden | G06N 5/04 |

* cited by examiner

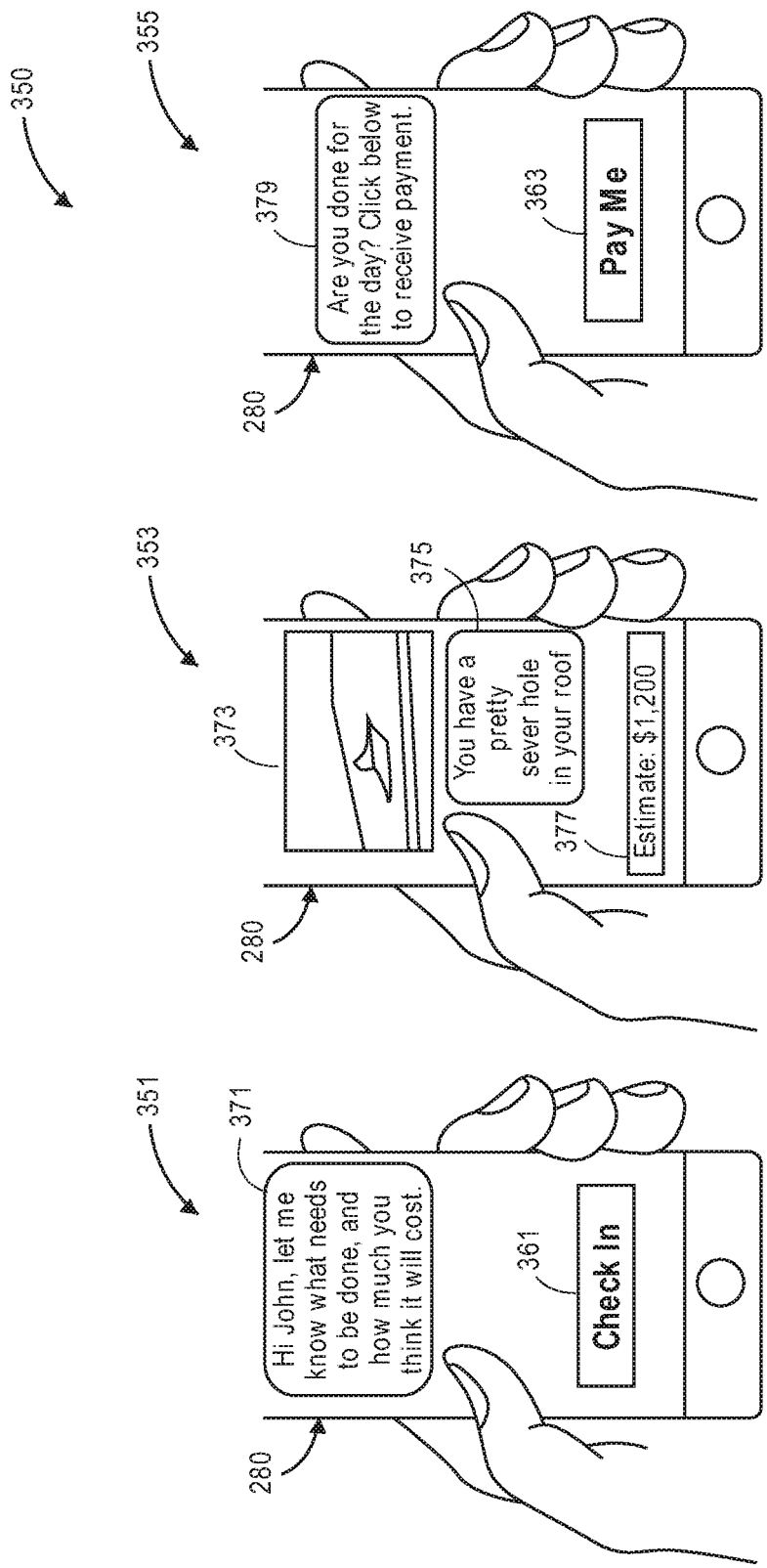

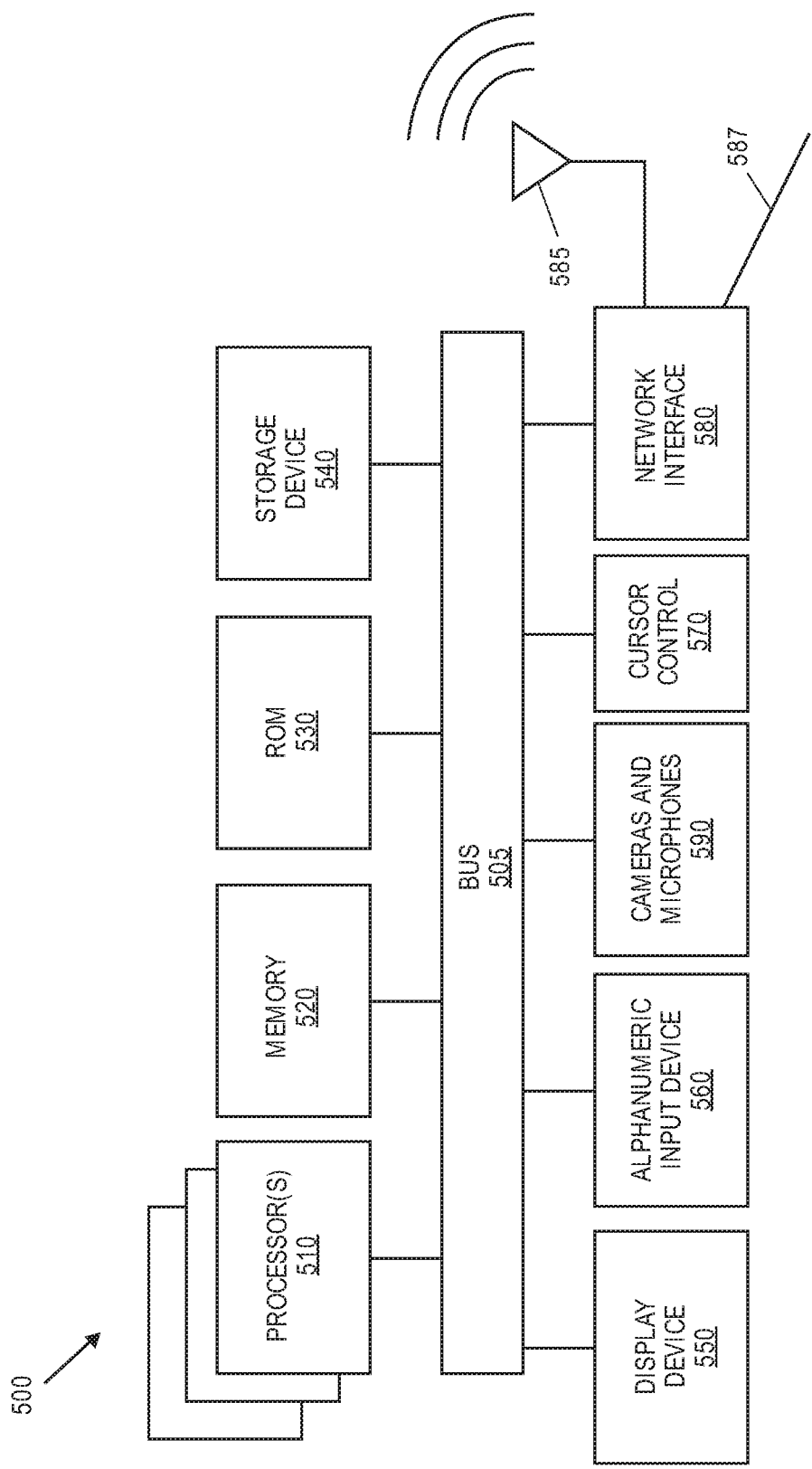

FACILITATING SMART GEO-FENCING-BASED PAYMENT TRANSACTIONS

FIELD

Embodiments described herein generally relate to computers. More particularly, embodiments relate to facilitating smart geo-fencing-based payment transactions.

BACKGROUND

Conventional person-to-person (P2P) techniques ("payment techniques" or simply "P2P techniques") are primarily payment-reception systems and are not regarded as secure, dependable, or versatile. Further, for example, conventional payment techniques are severely limited in that they do not provide for any verification of the payment-receiving user being at a location where services are to be provided or products are to be delivered.

BRIEF DESCRIPTION OF THE DRAWINGS

Embodiments are illustrated by way of example, and not by way of limitation, in the figures of the accompanying drawings in which like reference numerals refer to similar elements.

FIG. 3B illustrates a transaction sequence for a one-time payment according to one embodiment.

FIG. 5 illustrates computer environment suitable for implementing embodiments of the present disclosure according to one embodiment.

DETAILED DESCRIPTION

Figure 1:
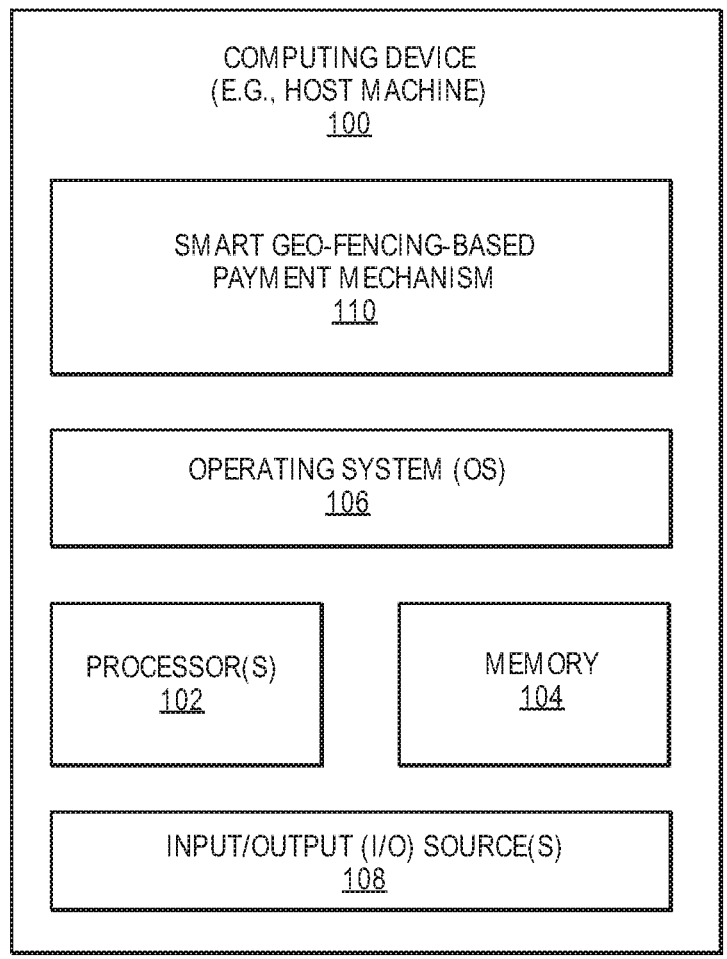
FIG. 1 illustrates a computing device employing a smart geo-fencing-based payment mechanism according to one embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for allowing secured and automatic payments based on a receiving individual's presence at or within proximity of a particular location. For example, a homeowner may wish to make a payment to a contractor for having some work done at the homeowner's house such that the payment may be made securely and automatically from the homeowner's computing device (e.g., mobile computer, smart wearable device, etc.) to the contractor's computing device (e.g., mobile computer, smart wearable device, etc.) when the contractor and/or his computing device are at a predefined location having or within proximity of another computing device, such as an Internet of Things (IoT) device (e.g., doormat ("mat"), rug, security panel, light fixture, fan, etc.). For example, this predefined location may be in or around the house, such as a doormat by the front door, near a wall, a hallway, in the backyard, etc.

It is contemplated that embodiments are not limited to merely homeowners such that a paying party (also referenced as "service receiver (SR)", "SR", "payer", "sender", "payer", "paying user", "source user") may include any number and type of individuals, groups of individuals, business entities, organizations, companies, institutions, etc. Similarly, a paying computing device (also referenced as "sending device", "paying device", or "source device") may include any number and type of computing devices (e.g., smart wearable devices, mobile computers, laptop computers, desktop computers, etc.) that are authorized to make payments using this novel technique. Further, throughout this document, any one or more of terms like "service receiver", "SR", "sender", "payer", and/or "source", etc., may be collectively referenced to include the sending user and the sending computing device.

Similarly, it is contemplated that embodiments are not limited to merely contractors such that a payment receiving party (also referenced as "service provider (SP)", "SP", "payee", "recipient", "receiver", "receiving user", or "target user") may include any number and type of individuals, groups of individuals, business entities, organizations, companies, institutions, etc. Similarly, a payment receiving computing device (also referenced as "payee device", "receiving device", "recipient device", or "target device") may include any number and type of computing devices (e.g., smart wearable devices, mobile computers, laptop computers, desktop computers, etc.) that are authorized to receive payments using this novel technique. Further, throughout this document, any one or more of terms like "service provider", "SP", "receiver", "recipient", "payee", and "target" may be collectively referenced to include the receiving user and the receiving computing device.

It is further contemplated that throughout this document, the term "payment" refers to monetary payment which may be made in one or more forms, such as credit cards, debit cards, electronic checks, cash transfers or wires, and/or the like.

It is further contemplated that embodiments are not merely limited to houses or any particular type of building, structure, physical location, etc., and that payments may be made and/or received for any type of products, services, etc. For example, payments may be made for maid services, baseball tickets, groceries, pizza delivery, car purchase, and/or the like. However, for brevity, clarify, and ease of understanding, throughout this document, regular maid services requiring recurring payments along with roof repair services requiring a one-time payment are used as examples but that embodiments are not limited as such.

For example, typically people have work done at their homes in their absence and so they leave the payment money inside or outside their homes in the form of a check or cash. With the rise in mobile devices, people are moving on to online banking or P2P payment systems. Cash is insecure, checks are inconvenient, while conventional online banking and P2P systems are inefficient, cumbersome, and lack the ability to verify whether the work or service has been performed, such as whether the service provider even showed up at the site as such conventional techniques do not depend on the recipient's presence at a specific location.

Embodiments provide for a novel technique that employs geo-fencing to verify the recipient's presence at a particular location, such as standing on a mat outside the front door of a house where the work is to be done. This is to ensure that the recipient is present at the location and the work is done before the payment is made. This provides the much-needed security and assurance to the sender. It is contemplated that geo-fencing refers to a virtual fence or barrier that uses global positioning system (GPS) or radio frequency identification (RFID) to define geographical boundaries.

It is contemplated and to be noted that embodiments are not limited to any particular number and type of software applications, application services, customized settings, etc., or any particular number and type of computing devices, networks, deployment details, etc.; however, for the sake of brevity, clarity, and ease of understanding, throughout this document, references are made to mats, doormats, wall-mounted devices, ceiling-mounted devices, other IoT devices, sensors, communication logic, geo-fencing, sending devices, receiving devices, user interfaces, software applications, user preferences, customized settings, mobile computers (e.g., smartphones, tablet computers, etc.), communication medium/network (e.g., cloud network, the Internet, proximity network, Bluetooth, etc.), but that embodiments are not limited as such.

FIG. 1 illustrates a computing device 100 employing a smart geo-fencing-based payment mechanism 110 according to one embodiment. Computing device 100 serves as a host machine for hosting smart geo-fencing-based payment mechanism ("payment mechanism") 110 that includes any number and type of components, as illustrated in FIG. 2, to facilitate dynamic and real-time secured and automatic payments based on geo-fencing of receivers as will be further described throughout this document.

Computing device 100 may include any number and type of data processing devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, head-mounted displays (HMDs) (e.g., wearable glasses, such as Google® Glass™, head-mounted binoculars, gaming displays, military headwear, etc.), and other wearable devices (e.g., smartwatches, bracelets, smartcards, jewelry, clothing items, etc.), and/or the like.

Computing device 100 may include an operating system (OS) 106 serving as an interface between hardware and/or physical resources of the computer device 100 and a user. Computing device 100 further includes one or more processor(s) 102, memory devices 104, network devices, drivers, or the like, as well as input/output (I/O) sources 108, such as touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a person or a group of individuals or persons using or having access to one or more computing devices, such as computing device 100.

Figure 2A:
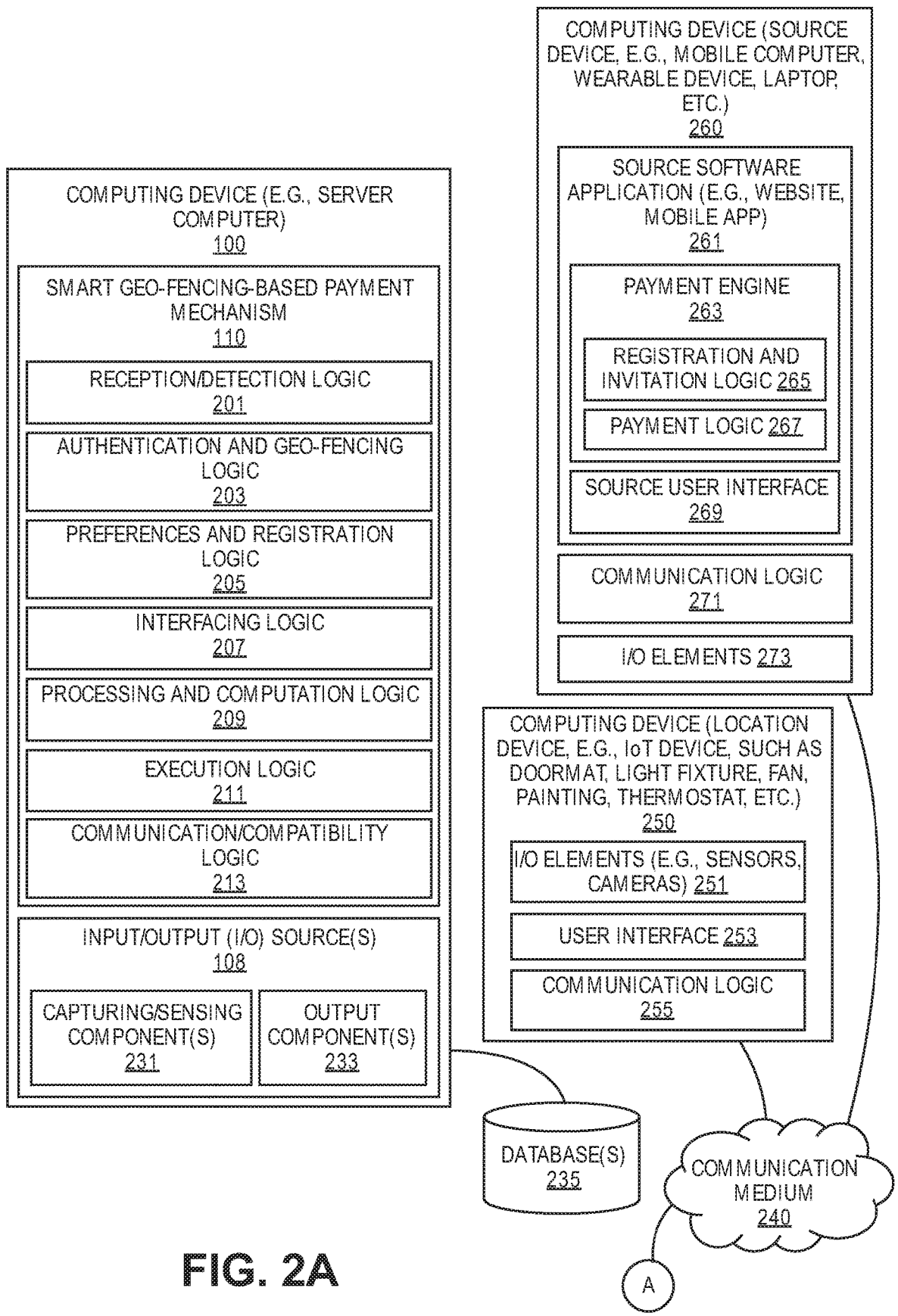
FIG. 2A illustrates a smart geo-fencing-based payment mechanism according to one embodiment.
Figure 2A:
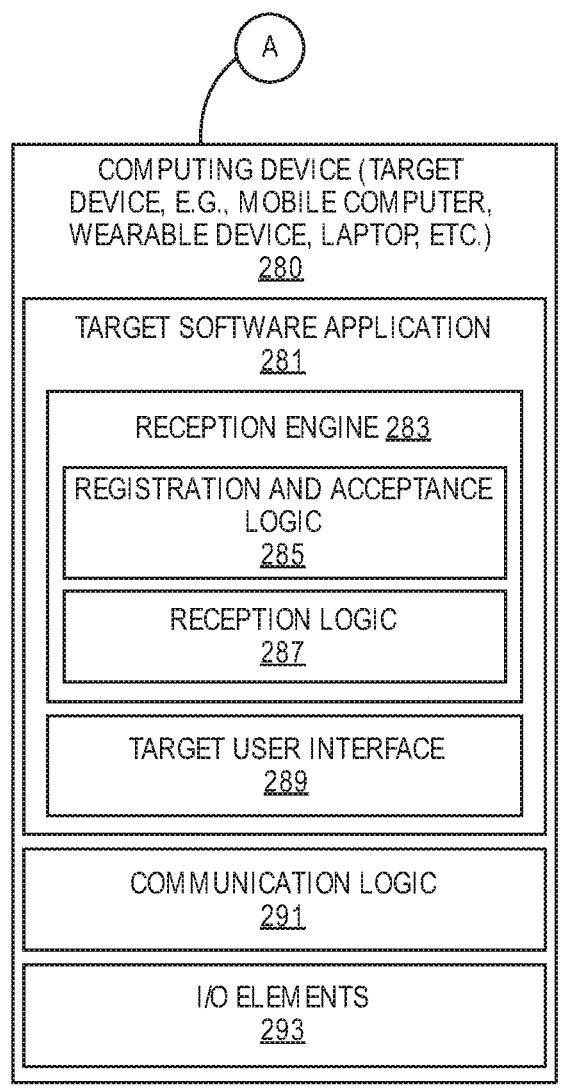

FIG. 2A illustrates a smart geo-fencing-based payment mechanism 110 according to one embodiment. In one embodiment, payment mechanism 110 may include any number and type of components, such as (without limitation): detection/reception logic 201; authentication and geo-fencing logic 203; preferences and registration logic 205; interfacing logic 207; processing and computation logic 209; execution logic 211; and communication/compatibility logic 213. Computing device 100 (e.g., server computer) is further shown as hosting input/output sources 108 having capturing/sensing components 231 and output sources 233.

Computing device 100 (e.g., server computer) may be communication with one or more other computing devices, such as computing device 250 (e.g., IoT device, etc., such as a doormat, a fan, a light fixture, a painting, a thermostat, etc.), also referred to as "location device" or "geo-fenced device"), computing device 260 (e.g., mobile computing device (such as smartphone, tablet computer, etc.), smart wearable device, HMDs, laptop computer, desktop computer, etc.), also referred to as "service receiver computer", "SR computer", "sender computer", or "source computer", and/or computing device 270 (e.g., mobile computing device (such as smartphone, tablet computer, etc.), smart wearable device, HMDs, laptop computer, desktop computer, etc.), also referred to as "server provider computer", "SP computer", "receiver computer", "recipient computer", or "target computer", over communication medium 240 (e.g., one or more networks, such as a cloud network, a proximity network, the Internet, etc.). Computing device is further shown as being in communication with one or more database(s) 235, including data sources, repositories, etc.

In the illustrated embodiment, computing device 100 includes a large computing machine, such as a server computer, hosting payment mechanism 110. However, it is contemplated that in some embodiments, other smaller computer devices, such as source computer 260 may host one or more or all of the components of payment mechanism 110. However, for brevity, clarity, and ease of understanding, throughout this document, payment mechanism 110 is discussed as being hosted by computing device 100, while computing devices 260 and 270 serve as personal/client source and target computers.

In one embodiment, location device 250 may include an IoT device, such as doormat, a thermostat, a fan, etc., that is typically found in and around a physical place (e.g., house, office, classroom, etc.) where various services (e.g., cleaning, roof fixing, floor work, painting, plumbing, appliance fixing, etc.) from service providers (e.g., vendors, contractors, plumbers, electricians, handymen, etc.) may be required. In one embodiment, location device 250 may include a doormat (or simply "mat") having embedded into it a set of I/O elements 251 (e.g., sensors, detectors, cameras, microphones, speakers, display devices, etc.), user interface 253, and communication logic 255.

In one embodiment, source computer 260 may host software application ("source application") 261 (e.g., website, mobile application, etc.) having one or more components, such as payment engine ("payment engine") 263 having registration and invitation logic 265 and payment logic 267. Source application 261 further provides source user interface 269 (e.g., browser, mobile application interface, etc.) and source communication logic 271. Source computer 260 further includes I/O element(s) 273 which may be similar to or the same as one or more I/O component(s) 108 of computing device 100 as will be later described in this document.

Similarly, in one embodiment, target computer 280 may host software application ("target application") 281 (e.g., website, mobile application, etc.) having one or more components, such as reception engine ("reception engine") 283 having registration and acceptance logic 285 and reception logic 287. Target application 281 further provides target user interface 289 (e.g., browser, mobile application interface, etc.) and target communication logic 291. Target computer 280 further includes I/O element(s) 293 which may be similar to or the same as one or more I/O component(s) 108 of computing device 100 as will be later described in this document.

In one embodiment, both the payment issuance and payment reception parts of source application 261 and target application 281, respectively, may be provided through the same software application. For example, source application 261 may also have components of target application 281 and thus may be fully capable of accepting payments along with issuing payments. Similarly, target application 281 may also have components of source application 261 and thus may be fully capable of issuing payments along with accepting payment. For example, a service provider having target computer 281 may receive payments when providing service to a receiver having access to source computer 261, but it is contemplated that there will be occasions when the service provider may be service receiver and in which case, in some embodiments, target application 281 may be used by the service provider to switch to payment interface, such as payment user interface 269 supported by payment engine 263, to make payments as opposed to receiving payments.

Computing device 100 may include I/O source(s) 108 (similar to I/O elements 251, 273, 293 of computing devices 250, 260, 280, respectively) including capturing/sensing components 231 and output components 233 which, as will be further described below, may also include any number and type of components, sensor arrays, detectors, displays, etc. For example, capturing/sensing components 231 may include (without limitation) two-dimensional (2D) cameras, three-dimensional (3D) cameras, depth-sensing cameras (e.g., Intel® RealSense™ camera, etc.), sensor arrays, microphones, etc., while, output components 233 may include (without limitation) display screens, display/projection areas, projectors, speakers, etc.

Computing devices 100 may be further in communication with one or more repositories or data sources or databases, such as database(s) 235, to obtain, communicate, store, and maintain any amount and type of data (e.g., user and/or device preferences, user and/or device profiles, authentication/verification data and/or metadata relating to users and/or devices, location information, geo-fencing criteria, recommendations, predictions, data tables, data maps, media, metadata, templates, real-time data, historical contents, user and/or device identification tags and other information, resources, policies, criteria, rules, regulations, upgrades, etc.).

In some embodiments, communication medium 240 may include any number and type of communication channels or networks, such as cloud network, the Internet, intranet, Internet of Things ("IoT"), proximity network, such as Bluetooth, Radio Frequency Identification (RFID), Near Field Communication (NFC), Body Area Network (BAN), etc. It is contemplated that embodiments are not limited to any particular number or type of computing devices, services or resources, databases, networks, etc.

Capturing/sensing components 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more capturing/sensing components 231 may further include one or more of supporting or supplemental devices for capturing and/or sensing of data, such as illuminators (e.g., infrared (IR) illuminator), light fixtures, generators, sound blockers, etc.

It is further contemplated that in one embodiment, capturing/sensing components 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing components 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, capturing/sensing components 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc. Capturing/sensing components 231 may further include voice recognition devices, photo recognition devices, facial and other body recognition components, voice-to-text conversion components, etc.

Similarly, output components 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

Figure 3A:
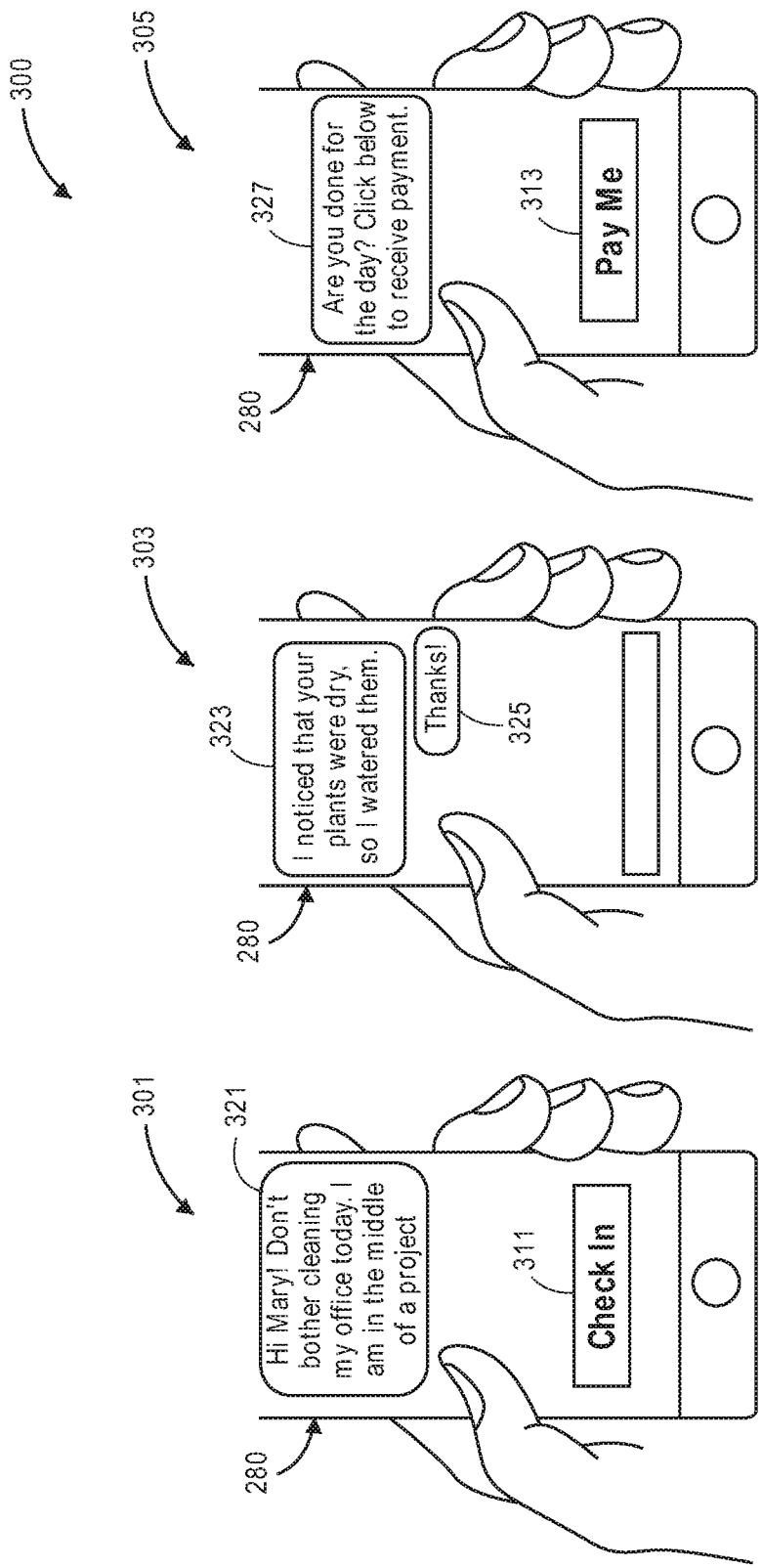
FIG. 3A illustrates a transaction sequence for a recurring payment according to one embodiment.

It is contemplated that embodiment are not limited to any particular number or type of use case scenarios; however, one or more use-case scenarios, such as those shown with respect to FIGS. 3A-3B, may be discussed throughout this document for the sake of brevity, clarity, and ease of understanding but it is to be noted that embodiments are not limited as such. Further, throughout this document, "user" may refer to someone having access to a computing device, such as one of computing devices 100, 250, 260, 280, and may be referenced interchangeably with "person", "individual", "human", "him", "her", "service provider", "service recipient", "homeowner", "vendor", "contractor", "payer", "payee", and/or the like.

In one embodiment, a user (such as sender, service receiver, SR, payer, etc.) having access to source computer 260 may employ the services of another user (such as recipient, service provider, SP, payee, etc.) to perform one or more jobs at the house of the SR. In one example, as illustrated with respect to FIG. 3A, one of the services may include housecleaning which may be performed by one or more maids on a regular basis, such as weekly, and thus require a recurring payment of a same amount that is previously agreed upon, such as 200.00 per week. In another example, as illustrated with respect to FIG. 3B, one of the services may include roof repair which may be a one-time job performed by a roof expert and thus require a single payment of a negotiated amount, such as $1,200.00. In either case, the SR may request the SP to come to the house and perform the request service.

In one embodiment, upon completing the requested service, the SP may wish to get paid and in order to do so, the SP and/or target computer 280 may need to get with a predetermined proximity of location device 250 to trigger the payment procedure as facilitated by payment mechanism 110. In one embodiment, if location device 250 includes an IoT device mounted on a wall or a ceiling, such as a fan, a thermostat, a painting, etc., the SP may need to get within the view of one or more sensors/detectors 251 (e.g., camera) of location device 250 to trigger payment mechanism 110. In another embodiment, if location device 250 includes an IoT device on the floor, such as a doormat in front of a front door of the SR's house, the SP may simply have to step on it to have one or more sensors/detectors 251 (e.g., pressure sensors, etc.) to detect the SP's presence. In yet another embodiment, one or more sensors/detectors 251 of location device 250 may detect target computer 280 when it is within proximity of sensors/detectors and communicate this to computing device 100 via communication logic 253 to trigger payment mechanism 110 to perform its tasks.

In any case, once the SP and/or target computer 280 is detected by sensors/detectors 251 of location device 250, this information may then be forwarded on to computing device 100 through communication logic 253 and over communication medium 240 (e.g., cloud network, proximity network, Internet, etc.). This information may be received at detection/reception logic 201 as facilitated by communication/compatibility logic 213. Once the information indicating the SP and/or target computer 280 have been detected in a particular location, such as within certain proximity of location device 250, this information may then be forwarded on to authentication and geo-fencing logic 203.

In one embodiment, authentication and geo-fencing logic 203 may be triggered to verify the SP and/or target computer 280 along with the geo-fencing assigned to this particular location device 250 and its corresponding user, such as the SR. For example, prior to seeking the SP's services, SR may choose to register the SP through registration and invitation logic 265 of source application 261 so that any necessary information (e.g., individual's name, company name, company address, business rating, experience, etc.) about the SP may be obtained prior to hiring the SP to perform any services.

In one embodiment, a registration form may be provided by registration and invitation logic 265 of payment engine 263 at source computer 260 and received at registration and acceptance logic 285 of reception engine 283 at target computer 280, over communication medium 240 as facilitated by communication logic 271, 291, to allow for SP to register for future services. It is contemplated that the registration form may include a questionnaire requesting any amount and type of general information from the SP (such as (without limitation) name, company name, company address, phone number, email address, business rating, experience, insurance, etc.), payment-related information (such as (without limitation) bank name, account number, routing number, etc.) and device information relating to target computer 280 and any other computing devices belonging to the SP, where device information may include (without limitation) device name, device brand, device serial number, device unique identification number, Internet Protocol (IP), Internet provider name, etc. In one embodiment, the SP may access the registration form via target user interface 289 and once the SP has filled out and signed the registration form, it may then be sent back to the SR via registration and acceptance logic 285 and registration and invitation logic 265 over communication medium 240 as facilitated by communication logic 271, 291.

Once the registration form is received back at registration and invitation logic 265, some or all of the information may be communicated over to payment mechanism 110 to identify and sort out any information that may be of help in identifying and authenticating the SP and/or target computer 280. Similarly, some or all of the information may be inputted into location device 250, via user interface 253 and/or source user interface 269, so that the SP and/or target computer 280 may be easily identified and verified in the future.

Moreover, the SR may choose to access source user interface 269 to register to receive services provided by payment mechanism 110 and in doing so, generate a user profile with payment mechanism 110 as facilitated by preferences and registration logic 205. For example, the SR may generate a profile having any number and type of preferences such as (without limitation): 1) acceptable mode(s) of payment (e.g., credit cards, debit cards, electronic checks, wire transfers, etc.) for any particular SPs or all SPs; 2) maximum amount (e.g., 2500) to be authorized and paid out in any one transaction to any particular SPs or all SPs; 3) one or more computing device(s) (e.g., IoT devices, such as doormat) to serve as location device(s) 250 for any particular SPs or all SPs; 4) a radius to serve as a geo-fencing parameter for location device 250 for any particular SPs or all SPs; and/or the like.

In one embodiment, any such registration and preferences information relating to any one or more of SR, SP, source computer 260, target computer 280, location device 250, etc., obtained by preferences and registration logic 205 may then be forwarded on to database(s) 235 for storage and maintenance. For example, once the SP and/or target computer 280 has been detected by location device 250 and authentication and geo-fencing logic 203 has received this information, authentication and geo-fencing logic 203 may then access database(s) 235 to check on relevant data/metadata in order to authenticate the credentials of the SP and/or target computer 280 along with verifying the SR-defined geo-fencing parameter before allowing payment mechanism 110 to perform any other tasks.

Once the SP and target computer 280 have been authenticated and at least one of them is verified to be at the location, such as within the proximity of location device 250 as authorized by the SR-defined geo-fencing limits, in one embodiment, authentication and geo-fencing logic 203 may trigger interfacing logic 207 to initiate interfacing between source computer 260 and target computer 280. Upon initiating interfacing, source and target computers 260, 280 may be placed in direct communication with each other over communication medium 240 using their respective user interfaces 269, 289.

For example, as illustrated with respect to FIGS. 3A and 3B, the SP may check-in using target user interface 289 and upon receiving a message from the SP through target computer 280, the SR may offer to pay using source user interface 269 and as facilitated by payment logic 267 of payment engine 263. Once the payment process is triggered by payment logic 267, a text or a link or a button, reciting an appropriate message (such as "Pay Me"), may appear at target computer as facilitated by reception logic 287. For example, the SP may click on the button to trigger the payment process as facilitated by reception logic 287.

In one embodiment, once the payment processing is triggered by payment logic 267 at source computer 260 and before the payment process is completed by reception logic 287 at target computer 280, processing and computation logic 209 at payment mechanism 110 may be triggered to ensure proper computation of the amount of money and its subsequent transfer money into the SP's bank account. For example, in case of recurring payments (such as weekly housecleaning, etc.), processing and computation logic 209 may ensure that the same amount is taken from the SR and provided to the SP using a preferred mode of payment (e.g., withdrawn from the SR's bank account and deposited into the SP's bank account, charged to the SR's credit card, etc.). In case of non-recurring payments (such as one-time roof repair), processing and computation logic 209 may compute and/or verify the amount of money agreed upon by the SR and the SP and ensure that the exact amount is provided from the SR to the SP using a preferred mode of payment.

In one embodiment, processing and computation logic 209 is further used to serve as an intermediary between the SR and the SP and their financial institutions (e.g., banks, etc.) so that the entire payment process, including any confidential data (e.g., account numbers, routing numbers, drivers license or identification numbers, passport numbers, etc.), may be kept confidential and secured, providing the necessary peace of mind and confidence to both the SR and the SP.

Once processing and computation logic 209 has perform its tasks, execution logic 211 may then be triggered to execute the payment transaction while applying any preferences or criteria as set forth by preferences and registration logic 205. In one embodiment, this execution of the payment transaction by execution logic 211 allows for a payment acceptance button (such as "Pay Me") to appear, as facilitated by reception logic 287, on target computer 280, where this payment acceptance button may be touched or clicked by the SP to complete the payment transaction and initiate the transfer of funds from the SR's financial institution to the SP's financial institution.

Communication/compatibility logic 213 may be used to facilitate dynamic communication and compatibility between computing devices 100, 250, 260, 280, database(s) 235, communication medium 240, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. In one example, "logic" may refer to or include a software component that is capable of working with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "payment system", "P2P", "geo-fencing", "payer", "payee", "source", "target", "service receiver", "SR", "service provider", "SP", "doormat", "mat", "secured", "privacy", "user", "user profile", "user preference", "user", "sender", "receiver", "personal device", "smart device", "mobile computer", "wearable device", "IoT device", etc., should not be read to limit embodiments to software or devices that carry that label in products or in literature external to this document.

It is contemplated that any number and type of components may be added to and/or removed from payment mechanism 110 to facilitate various embodiments including adding, removing, and/or enhancing certain features. For brevity, clarity, and ease of understanding of payment mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 2B:
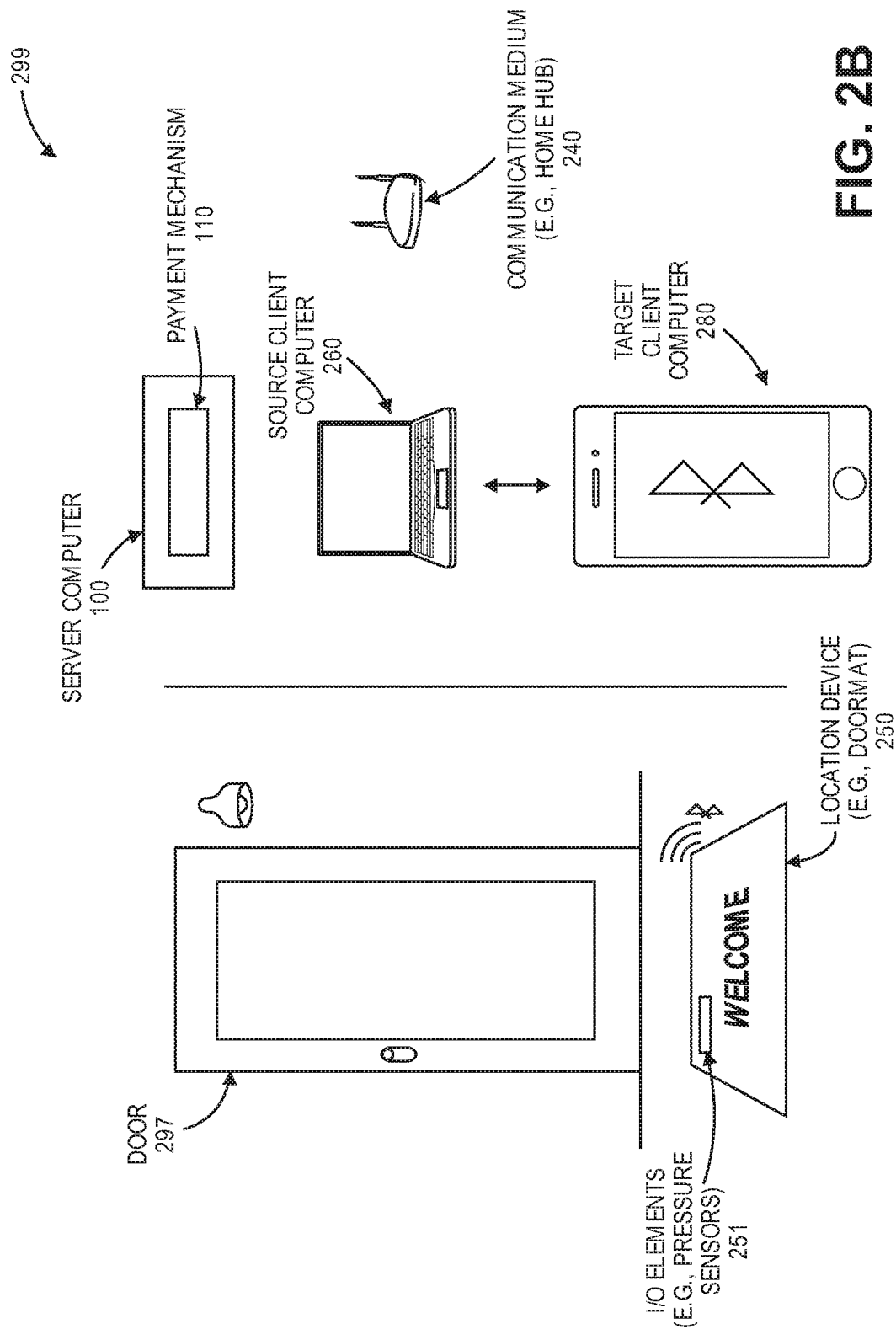
FIG. 2B illustrates an architectural placement according to one embodiment.

FIG. 2B illustrates an architectural placement 299 according to one embodiment. As an initial matter, for brevity, many of the details discussed with reference to the previous FIGS. 1-2A may not be discussed or repeated hereafter. Further, it is contemplated and to be noted that embodiments are not limited to any particular architectural placement, such as architectural placement 299.

As illustrated, in one embodiment, location device 250 may include a doormat that is shown as being placed in front of door 297 of house, where location device 250 includes one or more I/O elements 251, such as pressure sensors, to sense the SP when the SP steps on one or more pressure sensors of I/O elements 251 of location device 250.

In the illustrated embodiment, source computer 260 of the SR is shown in communication with target computer 280 of SP over communication medium 240 (e.g., home hub). As previously discussed with reference to FIG. 2A, pressure sensitive and geo-fenced location device 250 may trigger a payment application, such as source application 261, to open at source computer 260, interfacing with a payment reception application, such as target application 281, at target computer 280. Any payment transactions and/or other communication between source and target computers 260, 280 may be facilitated by payment mechanism 110 at computing device 100 (e.g., server computer).

FIG. 3A illustrates a transaction sequence 300 for a recurring payment according to one embodiment. Transaction sequence 300 may be performed by processing logic that may comprise hardware (e.g., circuitry, dedicated logic, programmable logic, etc.), software (such as instructions run on a processing device), or a combination thereof, as facilitated by payment mechanism 110 and/or source application 261 and/or target application 281 FIG. 2A. The processes of transaction sequence 300 are illustrated in linear sequences for brevity and clarity in presentation; however, it is contemplated that any number of them can be performed in parallel, asynchronously, or in different orders. For brevity, many of the details discussed with reference to the previous FIGS. 1-2B may not be discussed or repeated hereafter.

Transaction sequence 300 begins at process 301 with target computer 280 checking-in with a source computer, such as source computer 260 of FIG. 2A, by clicking on check-in button 311. This may lead to an SP receiving a message, such as message 321, at target computer 280 from an SR accessing the source computer. At process 303, the SR and the SP may exchange any other information through additional messages 323, 325. At process 305, payment acceptance button 313, along with any other messages, such as message 327, appears at target computer 280 to allow the SP to simply click on payment acceptance button 313 to receive the payment, where the SP clicks on payment acceptance button 313 and receives the payment.

FIG. 3B illustrates a transaction sequence 350 for a one-time payment according to one embodiment. Transaction sequence 350 may be performed by processing logic that may comprise hardware (e.g., circuitry, dedicated logic, programmable logic, etc.), software (such as instructions run on a processing device), or a combination thereof, as facilitated by payment mechanism 110 and/or source application 261 and/or target application 281 FIG. 2A. The processes of transaction sequence 350 are illustrated in linear sequences for brevity and clarity in presentation; however, it is contemplated that any number of them can be performed in parallel, asynchronously, or in different orders. For brevity, many of the details discussed with reference to the previous FIGS. 1-2B may not be discussed or repeated hereafter.

As with transaction sequence 300 of FIG. 3A, transaction sequence 350 begins at process 351 with target computer 280 checking-in with a source computer, such as source computer 260 of FIG. 2A, by clicking on check-in button 361. This may lead to an SP receiving a message, such as message 371, at target computer 280 from an SR accessing the source computer. At process 353, the SR and the SP may exchange any other information through additional messages 373, 375, 377, wherein message 373 includes a picture of a roof the SR's house. For example, in contrast with the recurring payment of transaction sequence 300 of FIG. 3A, transaction sequence 350 refers to a one-time payment for a one-time service and thus, SP may provide a picture in message 373 to provide to the SR some idea as to the level of work that might be required along with any comments in message 375, regarding the damage or job, and a price quote in message 377.

It is contemplated that if the price is acceptable to the SR, the requested service may be performed by the SP and subsequently, transaction sequence 350 continues with process 355 where another message 379 may appear from the SR enquiring about whether the job has been completed by the SP. Upon completion of the job, at process 355, payment acceptance button 363 appears at target computer 280 to allow the SP to simply click on payment acceptance button 363 to receive the payment, where the SP clicks on payment acceptance button 363 and receives the payment.

Figure 4A:
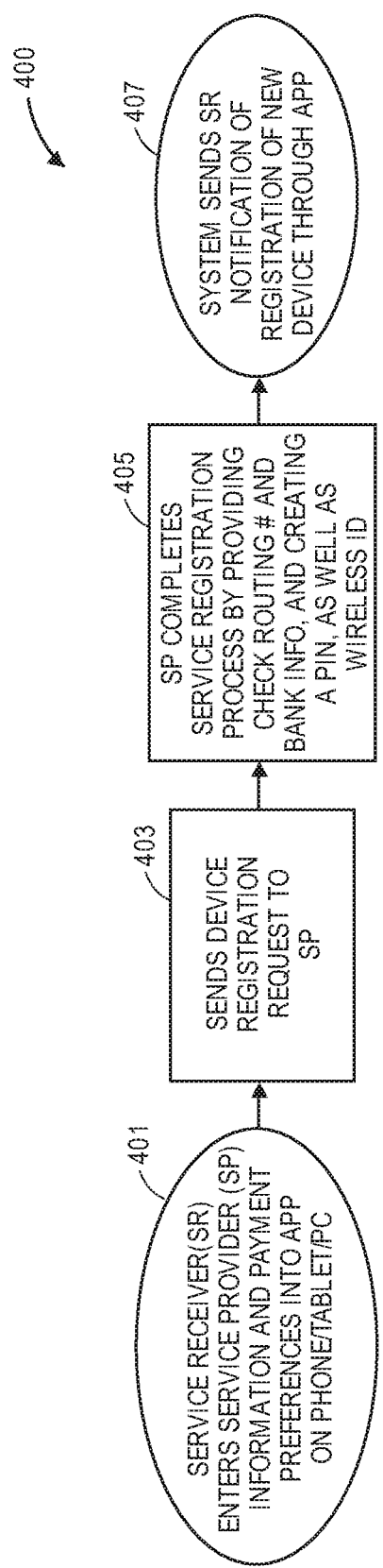
FIG. 4A illustrates a method for setting up computing devices to perform geo-fencing-based payment transactions according to one embodiment.

FIG. 4A illustrates a method 400 for setting up computing devices to perform geo-fencing-based payment transactions according to one embodiment. Method 400 may be performed by processing logic that may comprise hardware (e.g., circuitry, dedicated logic, programmable logic, etc.), software (such as instructions run on a processing device), or a combination thereof, as facilitated by payment mechanism 110 and/or source application 261 and/or target application 281 FIG. 2A. The processes of transaction sequence 400 are illustrated in linear sequences for brevity and clarity in presentation; however, it is contemplated that any number of them can be performed in parallel, asynchronously, or in different orders. For brevity, many of the details discussed with reference to the previous FIGS. 1-2B may not be discussed or repeated hereafter.

Method 400 begins at block 401 with an SR entering information relating to an SP along with other preferences and payment information using a user interface provided by a source application at a source computer, such as user interface 269 of source application 261 at source computer 260 of FIG. 2A. At block 403, the SR sends a registration request to the SP at target computer, such as target computer 280 of FIG. 2. At block 405, the SP completes a registration form received as part of the registration request and send its back to the SR from the target computer to the source computer over one or more networks, such as a cloud network, the Internet, etc. In filling out the registration form, the SP may provide any amount and type of information, such as bank account number, routing number, etc., and create one or more of a pin number, wireless identification, etc., for the purposes of identification, authentication, and secured payment transactions, etc. At block 407, a registration notification along with the completed registration form introducing the new SP and the corresponding new target computer are received by the SR at the source computer.

Figure 4B:
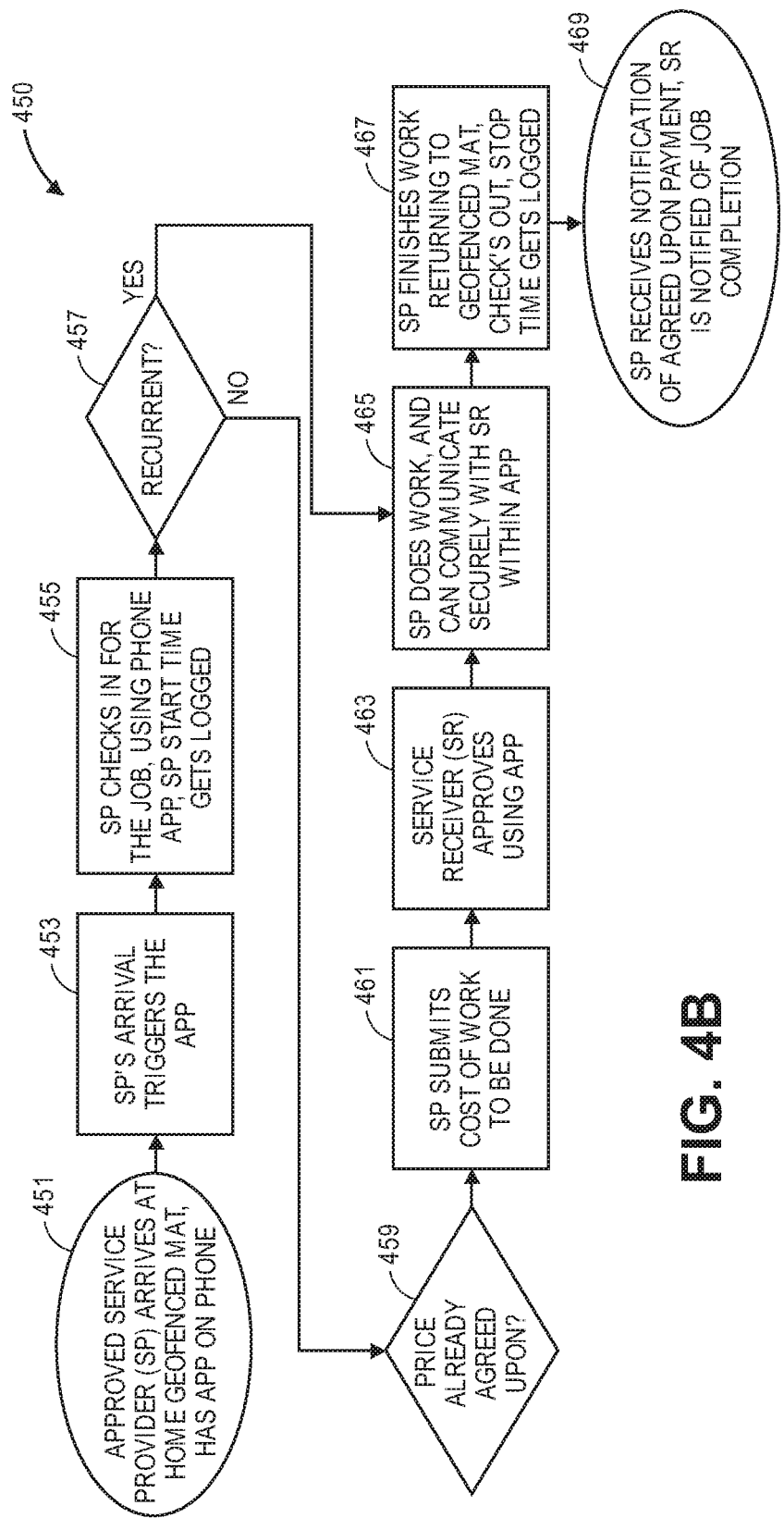
FIG. 4B illustrates a method for performing geo-fencing-based payment transactions according to one embodiment.

FIG. 4B illustrates a method 450 for performing geo-fencing-based payment transactions according to one embodiment. Method 450 may be performed by processing logic that may comprise hardware (e.g., circuitry, dedicated logic, programmable logic, etc.), software (such as instructions run on a processing device), or a combination thereof, as facilitated by payment mechanism 110 and/or source application 261 and/or target application 281 FIG. 2A. The processes of transaction sequence 450 are illustrated in linear sequences for brevity and clarity in presentation; however, it is contemplated that any number of them can be performed in parallel, asynchronously, or in different orders. For brevity, many of the details discussed with reference to the previous FIGS. 1-2B may not be discussed or repeated hereafter.

Method 450 begins at block 451 with an approved SP arriving at a designated location, such as an SR's house, and steps on or gets within a predefined proximity of a location device, such as a doormat. The presence of the SP and/or the corresponding target computer of the SP may be detected by one or more sensors of the location device (such as when the SP steps on those sensors) and/or through a proximity network (e.g., Bluetooth, RFID, NFC, BAN, etc.) by detecting the target computer within the predefined parameter of the location device. At block 453, the SP's arrival triggers a target application at the SP's target computer, such as target application 281 at target computer 280 of FIG. 2. At block 455, the SP checks in for the job via a user interface provided by the target application at the target computer and with that, the SP's start time gets logged.

At block 457, a determination is made as to whether this is a recurring job (such as housecleaning, etc., in FIG. 3A) or a one-time job (such as roof repair, etc., in FIG. 3B). If the service is a recurring service, at block 465, the SP performs the service and then communicates securely, using the target computer, with the SR at the source computer, such as via source application 261 of source computer 260 of FIG. 2 over a network, such as the Internet, a cloud network, etc. At block 467, the SP finishes the requested service and returns to the geo-fenced location device (e.g., doormat) to check out, stop the time, receive a payment, and logout. At block 469, in response to providing a job completion notification to the source computer of the SR, the SP receives, via the target computer, a payment notification and the payment for completing the service.

Referring back to block 457, if the payment is not a recurrent payment, then, at block 459, another determination is made as to whether the price has already been agreed upon between the SR and the SP. If, for example, the price has been already been agreed upon, such as the processing and computation logic 209 of payment mechanism 110 of FIG. 2 is aware of the price, method 400 continues with block 465 with the SP completing the job and communicating with the SR via the source and target computers and, at block 467, returning to the geo-fenced location device to trigger the final payment procedure, and at block 469, receiving the payment.

Referring back to block 459, if the price is unknown or has not been agreed upon, then, at block 461, the SP submit a price quote of the work to done from the target computer to the source computer, over a network, to inform the SR of the expected cost. At block 463, in one embodiment, the SR may receive the quoted priced at the target computer and accept the target computer using the target application, where upon accepting the price, a notification may be sent to the SP at the target computer. Further, once the prices has been accepted, method 450 continues with block 465 with the SP completing the job and communicating with the SR via the source and target computers and, at block 467, returning to the geo-fenced location device to trigger the final payment procedure, and at block 469, receiving the payment.

FIG. 5 illustrates an embodiment of a computing system 500 capable of supporting the operations discussed above. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 500 may be the same as or similar to or include computing devices 100 described in reference to FIG. 1.

Computing system 500 includes bus 505 (or, for example, a link, an interconnect, or another type of communication device or interface to communicate information) and processor 510 coupled to bus 505 that may process information. While computing system 500 is illustrated with a single processor, it may include multiple processors and/or co-processors, such as one or more of central processors, image signal processors, graphics processors, and vision processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Data storage device 540 may be coupled to bus 505 to store information and instructions. Data storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc.

Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 6:
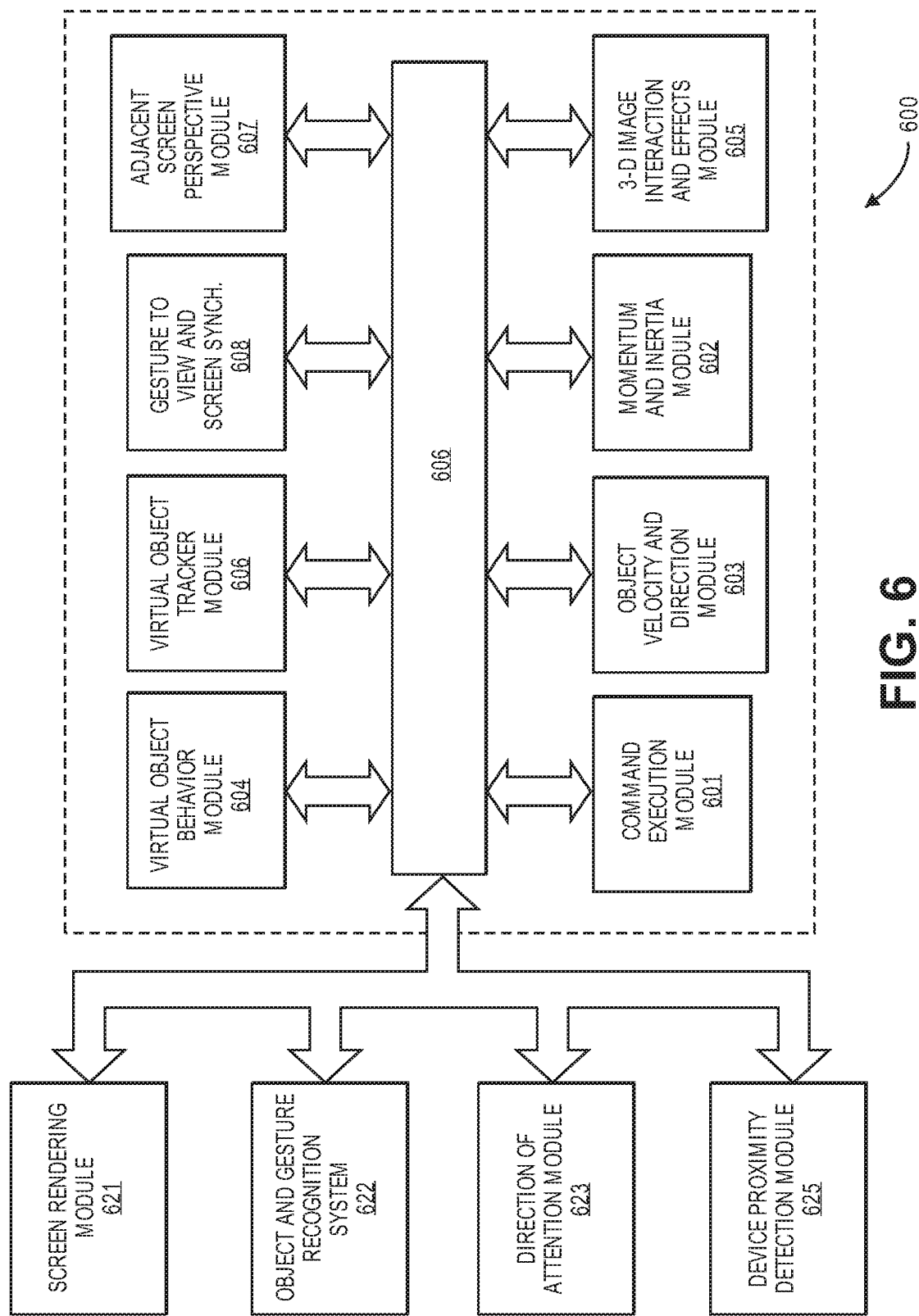
FIG. 6 illustrates a method for facilitating dynamic targeting of users and communicating of message according to one embodiment.

FIG. 6 illustrates an embodiment of a computing environment 600 capable of supporting the operations discussed above. The modules and systems can be implemented in a variety of different hardware architectures and form factors including that shown in FIG. 4.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition System 622. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers.

The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition System 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate smart geo-fencing-based payment transactions, comprising: one or more capturing/sensing components to detect a first computing device within proximity of a geo-fenced location; detection/reception logic to receive detection information relating to the detection of the first computing device; authentication and geo-fencing logic to authenticate at least one of the first computing device and the geo-fenced location; interfacing logic to interface the first computing device with a second computing device; processing and computation logic to facilitate a payment transaction, wherein the payment transaction includes payment of a monetary amount from the second computing device to the first computing device; and execution logic to execute the payment transaction.

Example 2 includes the subject matter of Example 1, wherein the detection information is received from a third computing device at the geo-fenced location, wherein the third computing device includes an Internet of Things (IoT) device having one or more input/output (I/O) elements to detect at least one of the first computing device and a first user having access to the first computing device at the geo-fenced location.

Example 3 includes the subject matter of Example 1, wherein the first computing device is detected over a proximity network using one or more device detecting sensors of the one or more I/O elements, and wherein the first user is detected using at least one of one or more pressure sensors and one or more cameras of the one or more I/O elements.

Example 4 includes the subject matter of Example 1, further comprising preferences and registration logic to register one or more of the first computing device, the second computing device, the third computing device, the first user, and a second user having access to the second computing device.

Example 5 includes the subject matter of Example 4, wherein the preferences and registration logic is further to receive preferences from the second user, wherein the preferences include one or more of payment criteria, identification information, and geo-fencing parameters, wherein the payment transaction is executed based on the preferences.

Example 6 includes the subject matter of Example 1, wherein the first and second computing device are interfaced over communication medium using a first software application at the first computing device and a second software application at the second computing device, wherein the communication medium includes one or more networks comprising at least one of a cloud computer, a proximity network, and the Internet.

Example 7 includes the subject matter of Example 5 or 6, wherein the first software application comprises a target software application having a reception engine to receive the payment, wherein the second software application comprises a source software application having a payment engine to issue the payment to the reception engine over the communication medium.

Example 8 includes the subject matter of Example 5, wherein the payment criteria comprise one or more preferred modes of payments, wherein the one or more preferred modes include one or more of credit cards, debit cards, electronic checks, and wire transfers.

Example 9 includes the subject matter of Example 2, wherein the IoT device comprises one or more of a wall-mounted device, a ceiling-mounted device, a floor-placed device, wherein the wall mounted device includes one or more of a painting, a thermostat, and a window, and wherein the ceiling-mounted device includes one or more of a fan, a light fixture, a speaker, and wherein the floor-placed device includes one or more of a doormat, a rug, a section of a hardwood floor, and a set of tiles.

Some embodiments pertain to Example 10 that includes a method for facilitating smart geo-fencing-based payment transactions, comprising: detecting, by one or more capturing/sensing components of a data processing device, a first computing device within proximity of a geo-fenced location; receiving detection information relating to the detection of the first computing device; authenticating at least one of the first computing device and the geo-fenced location; interfacing the first computing device with a second computing device; facilitating a payment transaction, wherein the payment transaction includes payment of a monetary amount from the second computing device to the first computing device; and executing the payment transaction.

Example 11 includes the subject matter of Example 10, wherein the detection information is received from a third computing device at the geo-fenced location, wherein the third computing device includes an Internet of Things (IoT) device having one or more input/output (I/O) elements to detect at least one of the first computing device and a first user having access to the first computing device at the geo-fenced location.

Example 12 includes the subject matter of Example 10, wherein the first computing device is detected over a proximity network using one or more device detecting sensors of the one or more I/O elements, and wherein the first user is detected using at least one of one or more pressure sensors and one or more cameras of the one or more I/O elements.

Example 13 includes the subject matter of Example 10, further comprising registering one or more of the first computing device, the second computing device, the third computing device, the first user, and a second user having access to the second computing device.

Example 14 includes the subject matter of Example 13, further comprising receiving preferences from the second user, wherein the preferences include one or more of payment criteria, identification information, and geo-fencing parameters, wherein the payment transaction is executed based on the preferences.

Example 15 includes the subject matter of Example 10, wherein the first and second computing device are interfaced over communication medium using a first software application at the first computing device and a second software application at the second computing device, wherein the communication medium includes one or more networks comprising at least one of a cloud computer, a proximity network, and the Internet.

Example 16 includes the subject matter of Example 14 or 15, wherein the first software application comprises a target software application for facilitating receiving of the payment, wherein the second software application comprises a source software application for facilitating issuance of the payment to the target software application over the communication medium.

Example 17 includes the subject matter of Example 15, wherein the payment criteria comprise one or more preferred modes of payments, wherein the one or more preferred modes include one or more of credit cards, debit cards, electronic checks, and wire transfers.

Example 18 includes the subject matter of Example 11, wherein the IoT device comprises one or more of a wall-mounted device, a ceiling-mounted device, a floor-placed device, wherein the wall mounted device includes one or more of a painting, a thermostat, and a window, and wherein the ceiling-mounted device includes one or more of a fan, a light fixture, a speaker, and wherein the floor-placed device includes one or more of a doormat, a rug, a section of a hardwood floor, and a set of tiles.

Some embodiments pertain to Example 19 includes a system comprising a storage device having instructions, and a processor to execute the instructions to facilitate a mechanism to: detect, by one or more capturing/sensing components of the system, a first computing device within proximity of a geo-fenced location; receive detection information relating to the detection of the first computing device; authenticate at least one of the first computing device and the geo-fenced location; interface the first computing device with a second computing device; facilitate a payment transaction, wherein the payment transaction includes payment of a monetary amount from the second computing device to the first computing device; and execute the payment transaction.

Example 20 includes the subject matter of Example 19, wherein the detection information is received from a third computing device at the geo-fenced location, wherein the third computing device includes an Internet of Things (IoT) device having one or more input/output (I/O) elements to detect at least one of the first computing device and a first user having access to the first computing device at the geo-fenced location.

Example 21 includes the subject matter of Example 19, wherein the first computing device is detected over a proximity network using one or more device detecting sensors of the one or more I/O elements, and wherein the first user is detected using at least one of one or more pressure sensors and one or more cameras of the one or more I/O elements.

Example 22 includes the subject matter of Example 19, wherein the mechanism is further to register one or more of the first computing device, the second computing device, the third computing device, the first user, and a second user having access to the second computing device.

Example 23 includes the subject matter of Example 22, wherein the mechanism is further to receive preferences from the second user, wherein the preferences include one or more of payment criteria, identification information, and geo-fencing parameters, wherein the payment transaction is executed based on the preferences.

Example 24 includes the subject matter of Example 19, wherein the first and second computing device are interfaced over communication medium using a first software application at the first computing device and a second software application at the second computing device, wherein the communication medium includes one or more networks comprising at least one of a cloud computer, a proximity network, and the Internet.

Example 25 includes the subject matter of Example 24, wherein the first software application comprises a target software application for facilitating receiving of the payment, wherein the second software application comprises a source software application for facilitating issuance of the payment to the target software application over the communication medium.

Example 26 includes the subject matter of Example 24 or 25, wherein the payment criteria comprise one or more preferred modes of payments, wherein the one or more preferred modes include one or more of credit cards, debit cards, electronic checks, and wire transfers.

Example 27 includes the subject matter of Example 20, wherein the IoT device comprises one or more of a wall-mounted device, a ceiling-mounted device, a floor-placed device, wherein the wall mounted device includes one or more of a painting, a thermostat, and a window, and wherein the ceiling-mounted device includes one or more of a fan, a light fixture, a speaker, and wherein the floor-placed device includes one or more of a doormat, a rug, a section of a hardwood floor, and a set of tiles.

Some embodiments pertain to Example 28 includes an apparatus comprising: means for detecting, by one or more capturing/sensing components of the apparatus, a first computing device within proximity of a geo-fenced location; means for receiving detection information relating to the detection of the first computing device; means for authenticating at least one of the first computing device and the geo-fenced location; means for interfacing the first computing device with a second computing device; means for facilitating a payment transaction, wherein the payment transaction includes payment of a monetary amount from the second computing device to the first computing device; and means for executing the payment transaction.

Example 29 includes the subject matter of Example 28, wherein the detection information is received from a third computing device at the geo-fenced location, wherein the third computing device includes an Internet of Things (IoT) device having one or more input/output (I/O) elements to detect at least one of the first computing device and a first user having access to the first computing device at the geo-fenced location.

Example 30 includes the subject matter of Example 28, wherein the first computing device is detected over a proximity network using one or more device detecting sensors of the one or more I/O elements, and wherein the first user is detected using at least one of one or more pressure sensors and one or more cameras of the one or more I/O elements.

Example 31 includes the subject matter of Example 28, further comprising means for registering one or more of the first computing device, the second computing device, the third computing device, the first user, and a second user having access to the second computing device.

Example 32 includes the subject matter of Example 31, further comprising means for receiving preferences from the second user, wherein the preferences include one or more of payment criteria, identification information, and geo-fencing parameters, wherein the payment transaction is executed based on the preferences.

Example 33 includes the subject matter of Example 28, wherein the first and second computing device are interfaced over communication medium using a first software application at the first computing device and a second software application at the second computing device, wherein the communication medium includes one or more networks comprising at least one of a cloud computer, a proximity network, and the Internet.

Example 34 includes the subject matter of Example 33, wherein the first software application comprises a target software application for facilitating receiving of the payment, wherein the second software application comprises a source software application for facilitating issuance of the payment to the target software application over the communication medium.

Example 35 includes the subject matter of Example 33 or 34, wherein the payment criteria comprise one or more preferred modes of payments, wherein the one or more preferred modes include one or more of credit cards, debit cards, electronic checks, and wire transfers.

Example 36 includes the subject matter of Example 29, wherein the IoT device comprises one or more of a wall-mounted device, a ceiling-mounted device, a floor-placed device, wherein the wall mounted device includes one or more of a painting, a thermostat, and a window, and wherein the ceiling-mounted device includes one or more of a fan, a light fixture, a speaker, and wherein the floor-placed device includes one or more of a doormat, a rug, a section of a hardwood floor, and a set of tiles.

Example 37 includes at least one non-transitory machine-readable medium comprising a plurality of instructions, when executed on a computing device, to implement or perform a method as claimed in any of claims or examples 10-18.

Example 38 includes at least one machine-readable medium comprising a plurality of instructions, when executed on a computing device, to implement or perform a method as claimed in any of claims or examples 10-18.

Example 39 includes a system comprising a mechanism to implement or perform a method as claimed in any of claims or examples 10-18.

Example 40 includes an apparatus comprising means for performing a method as claimed in any of claims or examples 10-18.

Example 41 includes a computing device arranged to implement or perform a method as claimed in any of claims or examples 10-18.

Example 42 includes a communications device arranged to implement or perform a method as claimed in any of claims or examples 10-18.

Example 43 includes at least one machine-readable medium comprising a plurality of instructions, when executed on a computing device, to implement or perform a method or realize an apparatus as claimed in any preceding claims or examples.

Example 44 includes at least one non-transitory machine-readable medium comprising a plurality of instructions, when executed on a computing device, to implement or perform a method or realize an apparatus as claimed in any preceding claims or examples.

Example 45 includes a system comprising a mechanism to implement or perform a method or realize an apparatus as claimed in any preceding claims or examples.

Example 46 includes an apparatus comprising means to perform a method as claimed in any preceding claims or examples.+

Example 47 includes a computing device arranged to implement or perform a method or realize an apparatus as claimed in any preceding claims or examples.

Example 48 includes a communications device arranged to implement or perform a method or realize an apparatus as claimed in any preceding claims or examples.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:
1. A system comprising:
  a pressure sensitive mat including at least one pressure sensor to detect when a first user is located within a geo-fenced location, the first user associated with a first computing device; and
  at least one processor in communication with the at least one pressure sensor, the at least one processor to execute computer readable instructions to:
    receive, from a second computing device, a user profile associated with execution of payment transactions for services provided to a second user, the user profile including geo-fence parameters associated with the geo-fenced location, a first one of the geo-fence parameters to define a radius of the geo-fenced location;

determine whether the first user is located within the geo-fenced location at a first time based on first detection information from the pressure sensor;

determine whether the first computing device is located within the radius defining the geo-fence location at the first time based on second detection information;

trigger initiation of communication between the first computing device and the second computing device in response to a first determination that the first user is located within the geo-fenced location at the first time based on the first detection information from the pressure sensor and the first computing device is located within the geo-fence location at the first time based on the second detection information;

receive a job completion notification from the first computing device at a second time after the first time, the job completion notification indicating that a task performed by the first user of the first computing device has been completed; and execute a payment transaction in response to the receipt of the job completion notification and a second determination that at least one of the first user or the first computing device is located within the geo-fenced location at the second time, the payment transaction including payment of a monetary amount from the second computing device to the first computing device.

2. The system of claim 1, wherein the second detection information is received from a third computing device at the geo-fenced location, wherein the third computing device includes an Internet of Things (IoT) device having one or more input/output (I/O) elements to detect the first computing device at the geo-fenced location.

3. The system of claim 2, wherein the first computing device is detected over a proximity network using one or more device detecting sensors of the one or more I/O elements.

4. The system of claim 2, wherein the at least one processor is to register one or more of the first computing device, the second computing device, the third computing device, the first user, or the second user.

5. The system of claim 4, wherein the at least one processor is to receive preferences from the second user, the preferences include one or more of payment criteria and identification information, and the processor is to execute the payment transaction based on the preferences.

6. The system of claim 5, wherein the payment criteria include one or more preferred modes of payments, wherein the one or more preferred modes include one or more of credit cards, debit cards, electronic checks, and wire transfers.

7. The system of claim 2, wherein the IoT device includes one or more of a wall-mounted device or a ceiling-mounted device, wherein the wall mounted device includes one or more of a painting, a thermostat, or a window, and wherein the ceiling-mounted device includes one or more of a fan, a light fixture, or a speaker.

8. The system of claim 1, wherein the first and second computing device are to communicate over a communication medium using a first software application at the first computing device and a second software application at the second computing device, wherein the communication medium includes one or more networks including at least one of a cloud computer, a proximity network, and the Internet.

9. The system of claim 8, wherein the first software application includes a target software application having a reception engine to receive the payment, and the second software application includes a source software application having a payment engine to issue the payment to the reception engine over the communication medium.

10. A method comprising:

detecting, with a pressure sensor of a pressure sensitive mat, whether a first user is located within a geo-fenced location, the first user associated with a first computing device;

receiving, by executing an instruction with a processor, a user profile from a second computing device, the user profile associated with execution of payment transactions for services provided to a second user, the user profile including geo-fence parameters associated with the geo-fenced location, a first one of the geo-fence parameters to define a radius of the geo-fenced location;

determining, by executing an instruction with the processor, whether the first user is located within the geo-fenced location at a first time based on first detection information from the pressure sensor;

determining, by executing an instruction with the processor, whether the first computing device is located within the radius defining the geo-fence location at the first time based on second detection information;

triggering, by executing an instruction with the processor, initiation of communication between the first computing device and the second computing device in response to a first determination that the first user is located within the geo-fenced location at the first time based on the first detection information from the pressure sensor and the first computing device is located within the geo-fence location at the first time based on the second detection information;

receiving, by executing an instruction with the processor, a job completion notification from the first computing device at a second time after the first time, the job completion notification indicating that a task performed by the first user of the first computing device has been completed; and executing, with the processor, a payment transaction in response to the receipt of the job completion notification and a second determination that at least one of the first user or the first computing device is located within the geo-fenced location at the second time, the payment transaction including payment of a monetary amount from the second computing device to the first computing device.

11. The method of claim 10, wherein the second detection information is received from a third computing device at the geo-fenced location, wherein the third computing device includes an Internet of Things (IoT) device having one or more input/output (I/O) elements to detect the first computing device at the geo-fenced location.

12. The method of claim 11, wherein the first computing device is detected over a proximity network using one or more device detecting sensors of the one or more I/O elements.

13. The method of claim 11, further including registering one or more of the first computing device, the second computing device, the third computing device, the first user, or the second user.

14. The method of claim 13, further comprising receiving preferences from the second user, wherein the preferences include one or more of payment criteria and identification information, wherein the payment transaction is executed based on the preferences.

15. The method of claim 14, wherein the payment criteria include one or more preferred modes of payments, wherein the one or more preferred modes include one or more of credit cards, debit cards, electronic checks, and wire transfers.

16. The method of claim 11, wherein the IoT device includes one or more of a wall-mounted device or a ceiling-mounted device, wherein the wall mounted device includes one or more of a painting, a thermostat, or a window, and wherein the ceiling-mounted device includes one or more of a fan, a light fixture, or a speaker.

17. The method of claim 10, wherein the first and second computing device communicate over a communication medium using a first software application at the first computing device and a second software application at the second computing device, wherein the communication medium includes one or more networks including at least one of a cloud computer, a proximity network, and the Internet.

18. The method of claim 17, wherein the first software application includes a target software application for facilitating receiving of the payment, and the second software application includes a source software application for facilitating issuance of the payment to the target software application over the communication medium.

* * * * *